Figure 1:
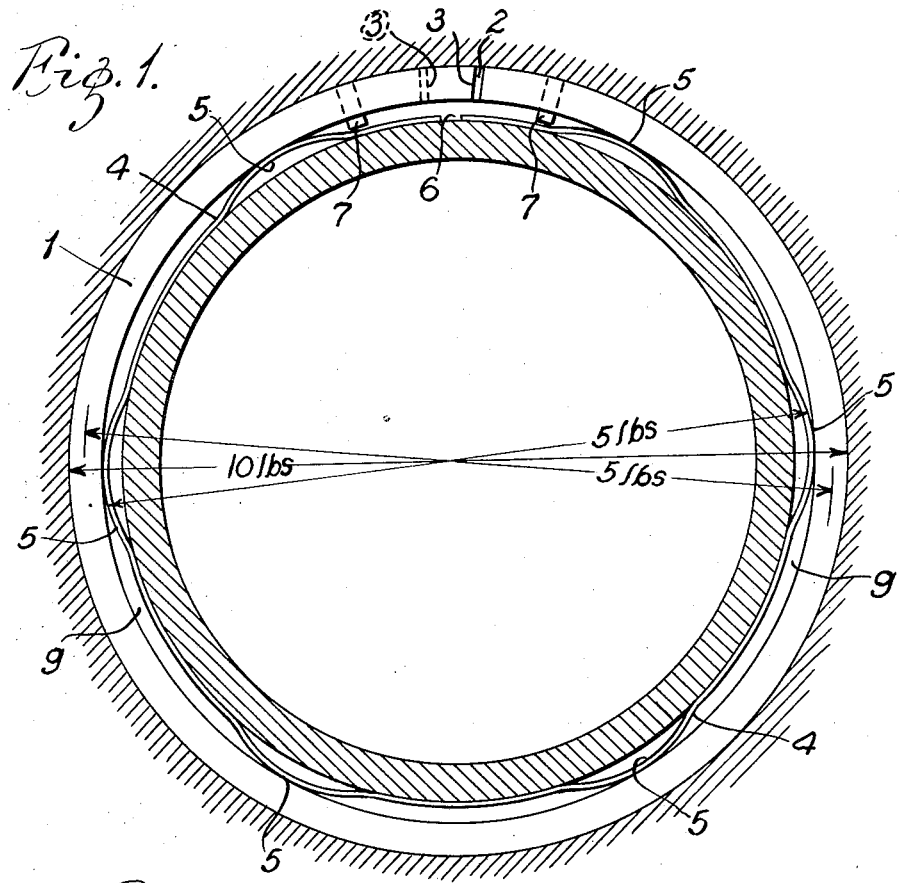

Nov. 29, 1932.   C. A. MARIEN   1,888,994

PISTON RING

Filed June 27, 1931

INVENTOR:
CHARLES A. MARIEN.
BY Harry A. Beimer
ATTORNEY.

Patented Nov. 29, 1932

1,888,994

UNITED STATES PATENT OFFICE

CHARLES A. MARIEN, OF ST. LOUIS, MISSOURI, ASSIGNOR TO RAMSEY ACCESSORIES MANUFACTURING CORPORATION, OF ST. LOUIS, MISSOURI, A CORPORATION OF MISSOURI

PISTON RING

Application filed June 27, 1931. Serial No. 547,225.

My invention has relation to improvements in piston rings for internal combustion engines and it consists in the novel features of construction more fully set forth in the specification and pointed out in the claims.

Briefly, the invention is directed to piston rings of the expander type, that is, those comprising an outer ring for contact with the cylinder wall, and an inner ring, or expander, for exerting pressure against the outer ring to hold it at all times in operative contact with the cylinder wall. Heretofore, it has been the practise of manufacturers to design compound rings of this type so that practically all the ring tension will be obtained from the expander, the outer ring being "dead", that is, containing practically no inherent tension. In engines designed for operation at very high speeds, difficulties have arisen due to the non-uniform diameter of the engine cylinder. It is well known among automotive engineers that due to unequal expansion under heat of operation, cylinders are wider at the top than at the bottom, and as the piston travels up and down in the cylinder the ring must continually expand and contract at a very rapid rate. When the ring depends solely on the expander to keep it in close contact with the cylinder wall through the varying diameters of the cylinder it often fails to maintain its working contact with said wall due to the inability of the expander's tension to overcome the sliding friction between the ring and expander and keep pace with the rapidly moving piston.

I have found through close observation and numerous experiments that if the ring tension is divided between the outer ring and the expander, a piston ring may be produced that will respond to the irregularities of the cylinder more rapidly than in a ring dependent on the expander alone for its tension. According to my observations, if no expander is used and the ring is dependent on its inherent tension alone to maintain the proper contact with the cylinder wall, it will vibrate, or chatter, in attempting to respond to the irregularities in the cylinder. The result of this vibration is excessive wear on the ring face which obviously shortens its useful life considerably. This vibration is at a maximum at the ring ends. On the other hand, if the ring is inert and depends on an expander to maintain the ring in contact with the cylinder wall it will not respond instantly to the varying diameter of the cylinder because friction between the expander and ring will retard the action of the expander, giving a similar action as above set forth.

The ideal arrangement is to have the total ring tension evenly divided between the outer ring and the expander; e. g., if the total tension required is such as to produce ten pounds wall pressure, sufficient tension will be built into the outer ring to provide five pounds wall pressure and the expander will be designed to give an additional five pounds wall pressure. The resulting pressures of this combination exerted on the cylinder wall at various points around the circumference of the ring will be maintained uniform by preventing circumferential shifting of the ring and the expander relative to each other.

Figure 2:
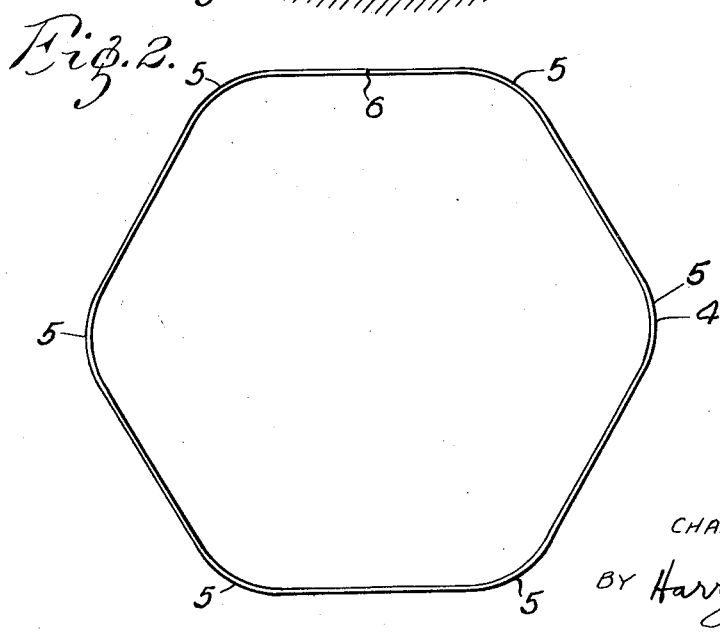

It is thus the object of the present invention to provide a piston ring comprising an outer and inner ring combination that will bear against the cylinder wall with sufficient pressure to prevent the passage of oil across the face of the ring at high engine speeds. The manner of accomplishing this object, together with other advantages inherent in the invention will be better apparent from a detailed description in connection with the accompanying drawing in which:

Figure 1 is an edge view of a combination outer and inner ring embodying the principles of this invention, the piston and cylinder being shown in section; and Fig. 2 is an edge view of the expander.

Referring to the drawing, 1 represents a plain split piston packing ring formed with inherent tension so that by itself it will exert maximum pressure against the cylinder wall of approximately five pounds. Owing to the ring gap 2 the pressure which the ring 1 is capable of exerting against the cylinder wall at its ends 3, 3 will be considerably less than the maximum, as will also be the pressure diametrically opposite the gap 2. Adapted for operation within the ring 1 is an expander 4, designed so that when the outer ring 1 is contracted to cylinder diameter, the expander will exert a maximum pressure of five pounds on the ring 1 so that the total pressure of ring 1 against the cylinder wall is imparted equally by the ring itself and the expander for the reasons above set forth. The pressures indicated on the drawing are not absolute, but are given for example only.

When the expander 4 and ring 1 are compressed into the ring groove g the pressure of the expander will be evenly distributed around the ring by the rounded corners 5 of the polygon. Thus, when the ring expands there will be considerable friction, due to relative movement of ring and expander, at these corners 5. For this reason the gap 2 in the ring 1 and gap 6 in the expander are placed opposite so ring and expander will expand as nearly as possible as a single unit. This reduces the sliding movement between the ring and expander and, of course, reduces the amount of friction since the greatest movement of both elements is immediately adjacent to the gaps 2 and 6. In order to prevent relative circumferential shifting of ring and expander, pins 7 are fixed into the ring 1 adjacent to the gap 2. These pins will serve as stops to prevent movement of the expander 4 as the rounded corners 5, 5 cannot slide over them.

A piston ring constructed as above described effectively controls the oil in the cylinder and has the advantages of quick-seating and long efficient operation. This is true because the outer packing ring is not dependent on the expander to keep it in contact with the cylinder wall, but, due to its own tension it instantly responds to irregularities in the cylinder wall. This is especially the case during the upward travel of the piston in the cylinder, which, as we have pointed out, widens toward the top, requiring the ring to expand quickly enough to maintain contact with the wall throughout the entire upward stroke.

The independent expansion of the outer ring releases the frictional engagement of the expander allowing the expander to quickly follow the movement of the outer ring, producing an extremely rapid co-action between these two elements.

Having described my invention, I claim:

1. In combination, an outer split packing ring and an inner split expander of polygonal shape, said ring and expander being positioned relative to each other so that the gaps are in alinement, said ring having a pin at each end thereof, said pin protruding inwardly of the ring at points on the expander intermediate adjacent corners thereof to prevent substantial disalinement of the gaps in the expander and the ring.

2. In combination with an outer split piston packing ring of substantially uniform thickness, an inner split expander of polygonal shape, said ring and expander being positioned relative to each other so that the gaps are in alinement, said ring having spaced pins extending inwardly therefrom and disposed between adjacent corners of the expander and spaced from said corners so as to engage the corners when the ring is in operation, and prevent substantial disalinement of the gaps in the ring and the expander.

In testimony whereof I hereunto affix my signature.

CHARLES A. MARIEN.